United States Patent
Ishikawa

(10) Patent No.: US 10,124,627 B2
(45) Date of Patent: Nov. 13, 2018

(54) TIRE

(71) Applicant: BRIDGESTONE CORPORATION, Chuo-ku, Tokyo (JP)

(72) Inventor: Satoshi Ishikawa, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 737 days.

(21) Appl. No.: 14/418,579

(22) PCT Filed: Aug. 5, 2013

(86) PCT No.: PCT/JP2013/004729
§ 371 (c)(1),
(2) Date: Jan. 30, 2015

(87) PCT Pub. No.: WO2014/024466
PCT Pub. Date: Feb. 13, 2014

(65) Prior Publication Data
US 2015/0306913 A1 Oct. 29, 2015

(30) Foreign Application Priority Data
Aug. 8, 2012 (JP) .................. 2012-176262

(51) Int. Cl.
*B60C 1/00* (2006.01)
*C08L 21/00* (2006.01)
(Continued)

(52) U.S. Cl.
CPC .......... *B60C 1/0016* (2013.01); *B60C 11/005* (2013.01); *B60C 11/0008* (2013.01);
(Continued)

(58) Field of Classification Search
CPC . B60C 1/0016; B60C 11/0008; B60C 11/005; B60C 11/14
See application file for complete search history.

(56) References Cited

U.S. PATENT DOCUMENTS

2004/0089388 A1* 5/2004 Fujino .................. B60C 1/0008
152/510

FOREIGN PATENT DOCUMENTS

| CN | 101072692 A | 11/2007 |
| CN | 101583660 A | 11/2009 |

(Continued)

OTHER PUBLICATIONS

Communication dated Aug. 3, 2015 from the State Intellectual Property Office of the People's Republic of China in counterpart application No. 201380042109.5.
(Continued)

*Primary Examiner* — Jacob T Minskey
*Assistant Examiner* — Melody Tsui
(74) *Attorney, Agent, or Firm* — Sughrue Mion, PLLC

(57) ABSTRACT

A tire can deliver improved on-ice performance with a reduced rolling resistance. The tire includes a foam rubber layer in a tread that comes into contact with a road surface, wherein a foaming ratio of the foam rubber layer is in a range from 3% to 50%, a rubber composition forming the foam rubber layer includes ethylene-vinylalcohol copolymer fiber coated with a resin having affinity for a rubber component, and the rubber composition forming the foam rubber layer includes 5 to 30 parts by mass at least one type of inorganic compound powder with respect to 100 parts by mass the rubber component, the inorganic compound powder having an average particle diameter greater than or equal to 10 μm and expressed by the following general formula (I).

$$M.xSiO_2.yH_2O \qquad (I)$$

6 Claims, 2 Drawing Sheets

(51) Int. Cl.
*B60C 11/14* (2006.01)
*C09D 123/02* (2006.01)
*B60C 11/00* (2006.01)
*C08J 9/00* (2006.01)

(52) U.S. Cl.
CPC ............ *B60C 11/14* (2013.01); *C08J 9/0066* (2013.01); *C08L 21/00* (2013.01); *C09D 123/02* (2013.01); *B60C 2011/147* (2013.01); *C08J 2329/06* (2013.01); *C08L 2203/14* (2013.01); *C08L 2205/16* (2013.01); *C08L 2312/00* (2013.01); *Y02T 10/862* (2013.01)

(56) References Cited

FOREIGN PATENT DOCUMENTS

| | | |
|---|---|---|
| EP | 0940435 A1 | 9/1999 |
| EP | 1820668 A1 | 8/2007 |
| EP | 2042549 A1 | 4/2009 |
| JP | 9-249005 A | 9/1997 |
| JP | 11-60770 A | 3/1999 |
| JP | 2001-233993 A | 8/2001 |
| JP | 2004-75718 A | 3/2004 |
| JP | 2009-144032 A | 7/2009 |
| JP | 2009-173840 A | 8/2009 |
| JP | 2009173840 A * | 8/2009 |
| JP | 2009173840 A * | 8/2009 |
| JP | 2010-195357 A | 9/2010 |
| JP | 2012-219246 A | 11/2012 |
| WO | 2012/140900 A1 | 10/2012 |

OTHER PUBLICATIONS

International Search Report for PCT/JP2013/004729 dated Sep. 17, 2013 [PCT/ISA/210].

* cited by examiner

TIRE

CROSS REFERENCE TO RELATED APPLICATIONS

This application is a National Stage of International Application No. PCT/JP2013/004729, filed on Aug. 5, 2013, which claims priority from Japanese Patent Application No. 2012-176262, filed on Aug. 8, 2012, the contents of all of which are incorporated herein by reference in their entirety.

TECHNICAL FIELD

The present invention relates to a tire, and particularly relates to a tire that can deliver improved on-ice performance with a reduced rolling resistance.

BACKGROUND ART

For enhanced vehicle safety, various studies have been conventionally conducted to improve the braking performance and driving performance of a tire on a variety of road surfaces including not only a dry road surface but also a wet road surface and an ice/snow road surface.

For example, the following tire has been disclosed to improve the tire performance on the ice/snow road surface. A rubber composition containing fiber that includes a resin is used in the tread, and long bubbles coated with the resin are formed after vulcanization. The long bubbles function as drainage channels as the tread wears, thus improving the drainage performance (for example, see Patent Literatures (PTLs) 1 and 2). Attempts have also been made to use a hydrophilic resin as the resin, to provide better drainage through its affinity for water.

However, improved on-ice performance with a reduced rolling resistance has not been achieved yet.

Typically, lowering the degree of foaming to improve the on-ice performance enhances the grip but also increases the rolling resistance.

There has thus been a strong need to improve the on-ice performance of the tire while reducing the rolling resistance of the tire.

CITATION LIST

Patent Literature

PTL 1: JP11-60770A
PTL 2: JP2001-233993A

SUMMARY OF INVENTION

Technical Problem

The present invention has an object of providing a tire that can deliver improved on-ice performance with a reduced rolling resistance.

Solution to Problem

A tire according to the present invention is a tire including a foam rubber layer in a tread that comes into contact with a road surface, wherein a foaming ratio of the foam rubber layer is in a range from 3% to 50%, a rubber composition forming the foam rubber layer includes ethylene-vinylalcohol copolymer fiber coated with a resin having affinity for a rubber component, and the rubber composition forming the foam rubber layer includes 5 to 30 parts by mass at least one type of inorganic compound powder with respect to 100 parts by mass the rubber component, the inorganic compound powder having an average particle diameter greater than or equal to 10 μm and expressed by the following general formula (I):

$$M \cdot xSiO_2 \cdot yH_2O \qquad (I)$$

where M is a metal oxide or a metal hydroxide of a metal selected from the group consisting of Al, Mg, Ti, and Ca, and x and y are each independently an integer from 0 to 10.

Advantageous Effect of Invention

According to the present invention, it is possible to provide a tire that can deliver improved on-ice performance with a reduced rolling resistance.

BRIEF DESCRIPTION OF DRAWINGS

The present invention will be further described below with reference to the accompanying drawings, wherein.

DESCRIPTION OF EMBODIMENTS

The following describes the present invention in detail with reference to drawings as necessary.

(Tire)

A tire according to the present invention includes at least a foam rubber layer in a tread that comes into contact with the road surface, and further includes other members as necessary.

<Structure of Tire>

Figure 1:
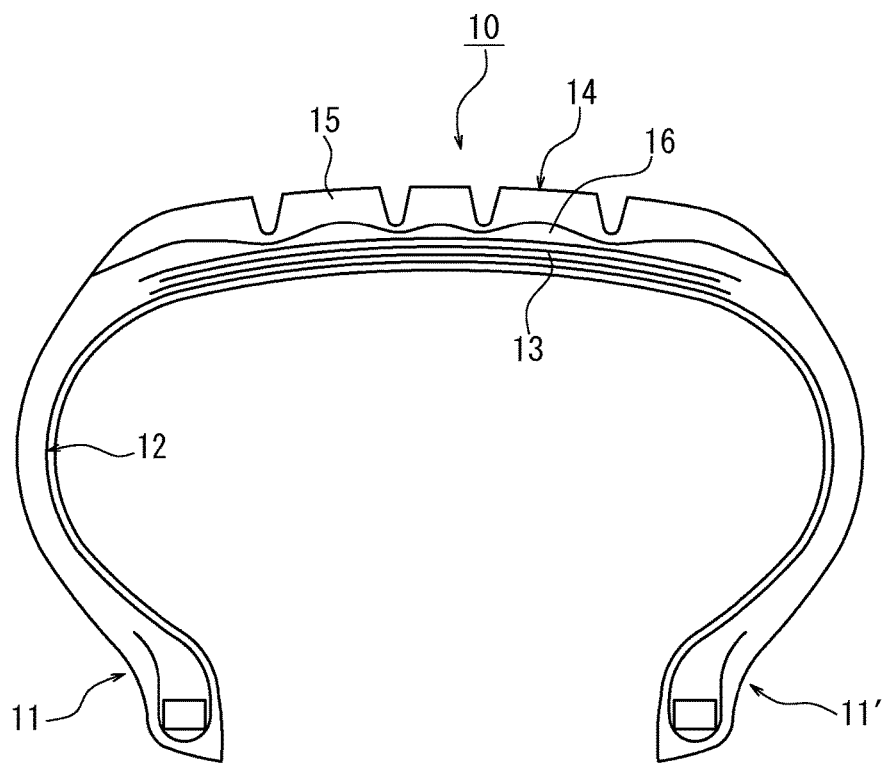
FIG. 1 is a schematic sectional view of a tire according to the present invention.

FIG. 1 is a schematic sectional view of a tire according to the present invention.

The tire according to the present invention is a tire having a foam rubber layer on its surface that substantially comes into contact with the road surface, and in particular a pneumatic tire having a foam rubber layer containing closed cells at least on the surface of the tire tread that substantially comes into contact with the road surface, as shown in FIG. 1.

For example, a tire 10 has a radial structure in which a pair of bead portions 11 and 11', a carcass 12 toroidally connected to the pair of bead portions 11 and 11', a belt 13 hooping a crown portion of the carcass 12, and a tread 14 made up of two layers of a cap portion 15 and a base portion 16 are arranged in order, as shown in FIG. 1. The cap portion 15 of the tread 14 is a foam rubber layer formed by vulcanizing a rubber composition.

The internal structure other than the tread 14 is the same as the structure of a typical radial tire, and so its description is omitted here.

The manufacturing method of the tire 10 is not particularly limited. For example, the tire 10 is vulcanized and molded using a predetermined mold at a predetermined temperature and a predetermined pressure. As a result, the tire 10 having the cap portion 15 which is the foam rubber layer in the present invention formed by vulcanizing the unvulcanized tread is obtained.

Though FIG. 1 shows the tread having the two-layer structure as an example, the structure of the tread is not particularly limited. The tread may have a one-layer structure, a multilayer structure divided in the tire radial direction, or a structure divided in the tire circumferential direction or the tread width direction. It is preferable that at least a part of the surface layer of the tread is made of the rubber composition.

<Foam Rubber Layer>

The rubber composition forming the foam rubber layer includes at least a rubber component, ethylene-vinylalcohol copolymer fiber, and an inorganic compound powder, and further includes carbon black, silica, a foaming agent, a foaming aid, and other components as necessary.

—Rubber Component—

The rubber component is not particularly limited, and may be appropriately selected depending on the purpose. Examples include natural rubber, various types of butadiene rubber (e.g. polybutadiene rubber), various types of styrene-butadiene copolymer rubber, isoprene rubber, butyl rubber, a bromide of isobutylene-p-methylstyrene copolymer, halogenated butyl rubber, acrylonitrile-butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydrin rubber, polysulfide rubber, silicone rubber, fluororubber, and urethane rubber. These may be used singly or in combination of two or more types.

Of these, the rubber component preferably includes natural rubber and polybutadiene rubber.

The content of the natural rubber is not particularly limited, and may be appropriately selected depending on the purpose. The content of the natural rubber is preferably 20 to 80 parts by mass and more preferably 30 to 50 parts by mass with respect to 100 parts by mass the rubber component.

The content of the natural rubber outside the preferable range may affect the tire performance, and degrade the on-ice performance or the processability.

The content of the polybutadiene rubber is not particularly limited, and may be appropriately selected depending on the purpose. The content of the polybutadiene rubber is preferably 20 to 80 parts by mass and more preferably 50 to 70 parts by mass with respect to 100 parts by mass the rubber component.

The content of the polybutadiene rubber outside the preferable range may affect the tire performance, and degrade the on-ice performance or the processability.

The glass transition temperature of the rubber component used in the tread of the tire is preferably less than or equal to −60° C. The use of the rubber component having such a glass transition temperature is advantageous in that the tread and the like maintain sufficient rubber elasticity even at low temperature and exhibit favorable on-ice performance.

—Ethylene-Vinylalcohol Copolymer Fiber—

The ethylene-vinylalcohol copolymer fiber is not particularly limited so long as it is coated with a resin having affinity for the rubber component, and may be appropriately selected depending on the purpose.

A coating layer made of a resin having affinity for the rubber component is formed on the surface of the ethylene-vinylalcohol copolymer fiber. By forming such a coating layer, high affinity for the rubber component near the fiber can be attained while effectively maintaining the affinity of the ethylene-vinylalcohol copolymer for water. This ensures favorable dispersion of the fiber in the rubber component, and sufficiently produces the drainage effect attributable to the ethylene-vinylalcohol copolymer. During vulcanization, the resin having affinity for the rubber component melts into a fluid coating layer, and facilitates the adhesion between the rubber and the fiber. A tire with favorable drainage and an excellent fracture resistance can be easily obtained in this way. The coating layer may be formed on the entire surface of the fiber or a part of the surface of the fiber. In detail, the coating layer is formed to occupy at least 50% of the entire surface area of the fiber.

—Resin having Affinity for Rubber Component—

The resin having affinity for the rubber component is not particularly limited, and may be appropriately selected depending on the purpose. The resin is preferably a polyolefin-based resin.

The polyolefin-based resin may be any of branched, linear, and the like. The polyolefin-based resin may be an ionomer resin in which molecules of an ethylene-methacrylic acid copolymer are crosslinked by metal ions. Specific examples of the polyolefin-based resin include a polyethylene-based resin, a polypropylene-based resin, a polybutene-based resin, a polystyrene-based resin, an ethylene-propylene copolymer, an ethylene-methacrylic acid copolymer, an ethylene-ethylacrylate copolymer, an ethylene-propylene-diene ternary copolymer, an ethylene-vinyl acetate copolymer, an ionomer resin (polyolefin ionomer resin) thereof, and a maleic anhydride modified α-polyolefin resin. These may be used singly or in combination of two or more types.

Of these, a polyethylene-based resin, a polypropylene-based resin, a polyolefin ionomer resin, and a maleic anhydride modified α-polyolefin resin are preferable. In the case where a polyolefin ionomer resin or a maleic anhydride modified α-polyolefin resin is used, the resin also adheres to a hydroxyl group, which contributes to improved rubber strength.

Figure 2:
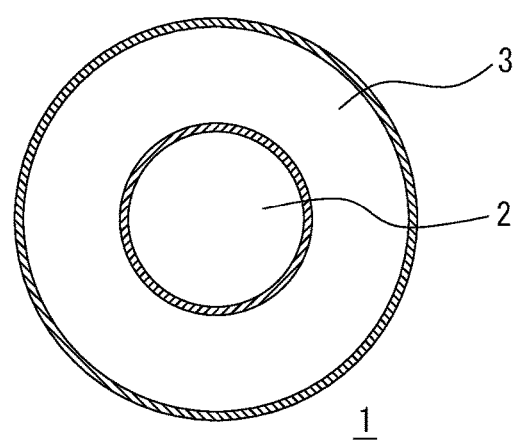
FIG. 2 is a vertical cross-sectional view of a die attached to a twin screw extruder.

Two twin screw extruders equipped with a die 1 shown in FIG. 2 are used to manufacture the fiber made of the ethylene-vinylalcohol copolymer on which the coating layer made of the resin that includes the resin having affinity for the rubber component is formed. The ethylene-vinylalcohol copolymer and the resin that includes the resin having affinity for the rubber component are co-extruded from a die outlet 2 and a die outlet 3, respectively. An undrawn yarn is formed from them, and made into fiber through hot stretching. Though the amount charged into a hopper can vary depending on the length or diameter of the obtained fiber, it is desirable that the resin having affinity for the rubber component is 0.1 to 80 parts by mass and preferably 0.1 to 20 parts by mass with respect to 100 parts by mass the ethylene-vinylalcohol copolymer. By charging these resins in the above-mentioned range, the coating layer for delivering the desired advantageous effects is effectively formed on the surface of the fiber made of the ethylene-vinylalcohol copolymer obtained as a result of the stretching process.

—Average Length of Fiber—

The average length of the fiber is not particularly limited, and may be appropriately selected depending on the purpose. The average length of the fiber is usually 0.1 mm to 500 mm, and preferably 0.1 mm to 7 mm.

When the average length of the fiber is 0.1 mm to 500 mm, there is no risk that the fibers are entangled with each other more than necessary and prevented from being dispersed favorably.

—Average Diameter of Fiber—

The average diameter of the fiber is not particularly limited, and may be appropriately selected depending on the purpose. The average diameter of the fiber is usually 0.001 mm to 2 mm, and preferably 0.005 mm to 0.5 mm.

When the average diameter of the fiber is 0.001 mm to 2 mm, there is no risk that the fibers are entangled with each other more than necessary and prevented from being dispersed favorably.

—Loading Amount of Fiber—

The loading amount of the fiber is not particularly limited, and may be appropriately selected depending on the purpose. The loading amount of the fiber is preferably 0.1 to 100 parts by mass, and more preferably 0.1 to 50 parts by mass.

When the loading amount of the fiber is 0.1 to 100 parts by mass, a sufficient fracture resistance can be attained while maintaining favorable drainage.

Figure 3A:
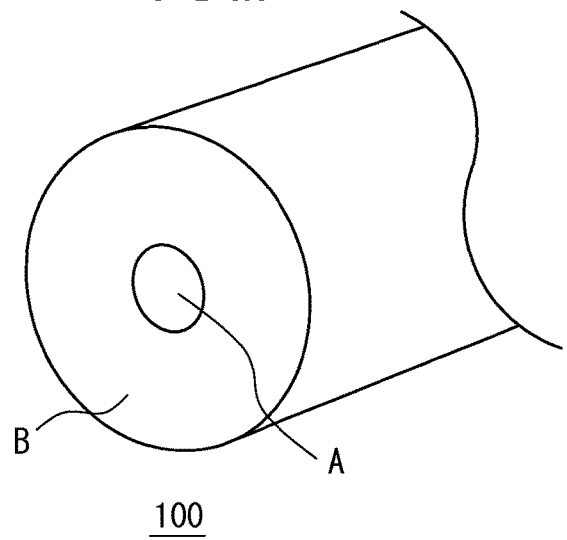
FIG. 3 is a perspective vertical cross-sectional view of fiber made of an ethylene-vinylalcohol copolymer on which a coating layer made of a resin having affinity for a rubber component is formed.
Figure 3B:
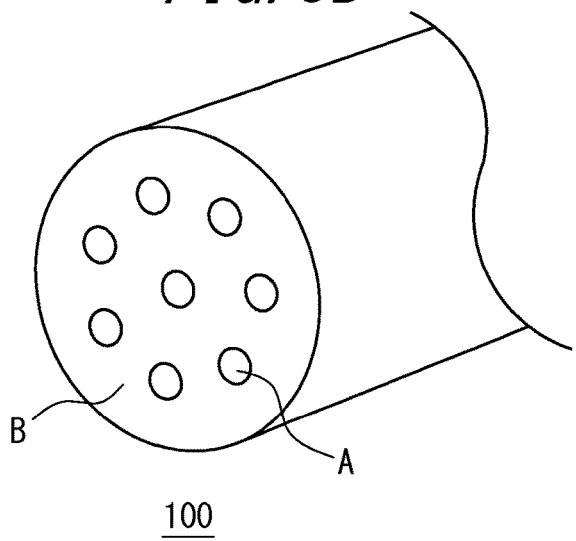

FIGS. 3(a) and (b) are each a perspective vertical cross-sectional view of an example of fiber 100 made of the ethylene-vinylalcohol copolymer on which the coating layer is formed. As shown in FIG. 3(a), the ethylene-vinylalcohol copolymer A positioned substantially at the center of the fiber 100 may be coated with the resin B having affinity for the rubber component in the form of surrounding the ethylene-vinylalcohol copolymer A. Alternatively, as shown in FIG. 3(b), the surface of the ethylene-vinylalcohol copolymer A may be coated with the resin B having affinity for the rubber component in the form in which the ethylene-vinylalcohol copolymer A is scattered in the resin B having affinity for the rubber component.

—Inorganic Compound Powder—

The inorganic compound powder is not particularly limited so long as it is expressed by the following general formula (I), and may be appropriately selected depending on the purpose:

$$M.xSiO_2.yH_2O \qquad (I)$$

where M is a metal oxide or a metal hydroxide of a metal selected from the group consisting of Al, Mg, Ti, and Ca, and x and y are each independently an integer from 0 to 10.

The inorganic compound powder expressed by the general formula (I) is not particularly limited, and may be appropriately selected depending on the purpose. Examples include alumina ($Al_2O_3$), aluminum hydroxide [$Al(OH)_3$], magnesium hydroxide [$Mg(OH)_2$], magnesium oxide (MgO), titanium white ($TiO_2$), titanium black ($TiO_{2n-1}$), talc ($3MgO.4SiO_2.H_2O$), attapulgite ($5MgO.8SiO_2.9H_2O$), clay ($Al_2O_3.2SiO_2$), kaolin ($Al_2O_3.2SiO_2.2H_2O$), pyrophyllite ($Al_2O_3.4SiO_2.H_2O$), and bentonite ($Al_2O_3.4SiO_2.2H_2O$). Calcium magnesium silicate ($CaMgSiO_4$) and magnesium silicate ($MgSiO_3$) also deliver the same advantageous effects as the inorganic compound powder in the present invention. These may be used singly or in combination of two or more types.

Of these, aluminum hydroxide [$Al(OH)_3$] and an inorganic compound powder expressed by the following general formula (II) are preferable, and aluminum hydroxide is particularly preferable for improvements in on-ice performance and wet performance. Aluminum hydroxide used in the present invention includes hydrated alumina.

$$Al_2O_3.mSiO_2.nH_2O \qquad (II)$$

where m and n are each independently an integer from 0 to 4.

The inorganic compound expressed by the general formula (II) is not particularly limited, and may be appropriately selected depending on the purpose. Examples include alumina, clay ($Al_2O_3.2SiO_2$), kaolin ($Al_2O_3.2SiO_2.2H_2O$), pyrophyllite ($Al_2O_3.4SiO_2.H_2O$), and bentonite ($Al_2O_3.4SiO_2.2H_2O$). These may be used singly or in combination of two or more types.

Of these, clay ($Al_2O_3.2SiO_2$) and alumina ($Al_2O_3$) are preferable.

—Average Particle Diameter of Inorganic Compound Powder—

The average particle diameter of the inorganic compound powder is not particularly limited so long as it is greater than or equal to 10 μm, and may be appropriately selected depending on the purpose. The average particle diameter of the inorganic compound powder is preferably 10 μm to 40 μm, and more preferably 18 μm to 30 μm.

The average particle diameter of the inorganic compound powder greater than or equal to 10 μm can improve the on-ice performance. A larger particle diameter of the inorganic compound powder leads to larger drainage channels, enabling efficient drainage. The drainage performance is improved in this way. Meanwhile, the average particle diameter of the inorganic compound powder less than or equal to 40 μm is preferable because the fracture resistance property and especially the abrasion resistance of the tire tread rubber are little affected.

—Loading Amount of Inorganic Compound Powder—

The loading amount of the inorganic compound powder is not particularly limited so long as it is 5 to 30 parts by mass with respect to 100 parts by mass the rubber component, and may be appropriately selected depending on the purpose. The loading amount of the inorganic compound powder is preferably 10 to 15 parts by mass.

The loading amount of the inorganic compound powder below 5 parts by mass cannot improve the on-ice performance. The loading amount of the inorganic compound powder exceeding 30 parts by mass adversely affects the abrasion resistance.

—Carbon Black—

The carbon black is not particularly limited so long as it enhances the dynamic performance of the rubber layer and improves the processability and the like, and known carbon black with $I_2$ adsorption amount, CTAB specific surface area, $N_2$ adsorption amount, DBP adsorption amount, and the like in appropriately selected ranges may be used.

The type of the carbon black is not particularly limited, and may be appropriately selected depending on the purpose. Examples include known carbon blacks such as SAF, ISAF-LS, HAF, and HAF-HS.

The loading amount of the carbon black is not particularly limited, and may be appropriately selected depending on the purpose. The loading amount of the carbon black is preferably 5 to 55 parts by mass and more preferably 10 to 50 parts by mass with respect to 100 parts by mass the rubber component.

The loading amount of the carbon black below 5 parts by mass or exceeding 55 parts by mass may decrease the tire performance and adversely affect the on-ice performance.

—Silica—

The silica is not particularly limited, and may be appropriately selected depending on the purpose. Though the silica may be any of wet silica and dry silica, wet silica is preferable.

The loading amount of the silica is not particularly limited, and may be appropriately selected depending on the purpose. The loading amount of the silica is preferably 5 to 55 parts by mass and more preferably 30 to 50 parts by mass with respect to 100 parts by mass the rubber component.

The loading amount of the silica below 5 parts by mass or exceeding 55 parts by mass may decrease the fracture resistance and adversely affect the workability.

—Foaming Agent and Foaming Aid—

The foaming agent is mixed in the unvulcanized rubber composition prior to the formation of the foam rubber layer, to form bubbles after vulcanization. The use of the foaming agent allows the foam rubber layer as the tread or the vulcanized rubber to have long bubbles and form microscopic drainage channels, thus providing water film removal performance.

The foaming agent is not particularly limited, and may be appropriately selected depending on the purpose. Examples include dinitrosopentamethylenetetramine (DNPT), azodicarbonamide (ADCA), dinitrosopentastyrenetetramine or benzenesulfonylhydrazide derivative, oxybisbenzenesulfonylhydrazide (OBSH), ammonium hydrogen carbonate generating carbon dioxide, sodium hydrogen carbonate, ammonium carbonate, a nitrososulfonylazo compound generating nitrogen, N,N'-dimethyl-N,N'-dinitrosophthalamide, toluenesulfonylhydrazide, p-toluenesulfonylsemicarbazide, and p,p'-oxybis(benzensulphonylsemicarbazide). These may be used singly or in combination of two or more types.

Of these, dinitrosopentamethylenetetramine (DNPT) and azodicarbonamide (ADCA) are preferable in terms of manufacturability. Through the action of the foaming agent, the obtained vulcanized rubber becomes foam rubber having a high foaming ratio.

The content of the foaming agent is not particularly limited, and may be appropriately selected depending on the purpose. The content of the foaming agent is preferably about 1 to 10 parts by mass with respect to 100 parts by mass the rubber component.

For efficient foaming, it is preferable to use the foaming aid as another component together with the foaming agent.

The foaming aid is not particularly limited, and may be appropriately selected depending on the purpose. Examples include aids typically used to manufacture foam products, such as urea, zinc stearate, zinc benzenesulfinate, and zinc flower. These may be used singly or in combination of two or more types.

Of these, urea, zinc stearate, and zinc benzenesulfinate are preferable.

—Other Components—

The other components can be used within the range that does not interfere with the advantageous effects of the present invention. Examples include: a vulcanizer such as sulfur; a vulcanization accelerator such as dibenzothiazyldisulfide; a vulcanization acceleration aid; a sulfuration prevention agent such as N-cyclohexyl-2-benzothiazyl-sulfenamide or N-oxydiethylene-benzothiazyl-sulfenamide; an antiozonant; a colorant; an antistat; a dispersant; a lubricant; an antioxidant; a softener; an inorganic filler other than carbon black and silica; and various compounding agents typically used in the rubber industry. These may be used singly or in combination of two or more types. A commercial item may be used.

—Formation Method of Foam Rubber Layer—

The formation method of the foam rubber layer is not particularly limited, and may be appropriately selected depending on the purpose. An example is a method of kneading, warming, extruding, etc. the rubber composition with the following conditions and techniques.

In kneading, various conditions of a kneading apparatus and the like such as the volume charged into the kneading apparatus, the rotor rotation speed, the kneading temperature, and the kneading time are not particularly limited, and may be appropriately selected depending on the purpose. A commercial item may be used as the kneading apparatus.

In warming or extrusion, various conditions of a warming or extrusion apparatus and the like such as the warming or extrusion time are not particularly limited, and may be appropriately selected depending on the purpose. A commercial item may be used as the warming or extrusion apparatus.

In the case where the foaming agent is present, the warming or extrusion temperature is appropriately selected in the range that does not cause foaming. The extrusion temperature is not particularly limited, and may be appropriately selected depending on the purpose. The extrusion temperature is preferably about 90° C. to 110° C.

The conditions and method of vulcanization are not particularly limited, and may be appropriately selected depending on the type of the rubber component, etc. In the case of manufacturing the foam rubber layer as the tread, mold vulcanization is preferable. The vulcanization temperature is not particularly limited, and may be appropriately selected depending on the purpose. The vulcanization apparatus is not particularly limited, and a commercial item can be suitably used.

—Foaming Ratio of Foam Rubber Layer—

The foaming ratio of the foam rubber layer is not particularly limited so long as it is 3% to 50%, and may be appropriately selected depending on the purpose. The foaming ratio of the foam rubber layer is preferably 15% to 40%.

The foaming ratio below 3% causes the depressions in the tread to be small in volume, and cannot sufficiently improve the on-ice performance. The foaming ratio exceeding 50% contributes to sufficient on-ice performance in the tread, but is not preferable in terms of durability because the fracture limitation tends to decrease due to the presence of a large number of bubbles in the tread.

The foaming ratio Vs means the total foaming ratio in the vulcanized rubber or the tread, and can be calculated by the following equation:

$$Vs = \{(\rho_0/\rho_1) - 1\} \times 100 (\%)$$

where $\rho_1$ denotes the density (g/cm$^3$) of the vulcanized rubber (foam rubber), and $\rho_0$ denotes the density (g/cm$^3$) of the solid phase part in the vulcanized rubber (foam rubber). For example, the density of the vulcanized rubber (foam rubber) and the density of the solid phase part in the vulcanized rubber (foam rubber) can be calculated from the measurement of the mass in ethanol and the mass in air.

The average diameter (μm) of the long bubbles formed in the foam rubber layer is not particularly limited, and may be appropriately selected depending on the purpose. The average diameter of the long bubbles is preferably about 10 μm to 500 μm. The average diameter below 10 μm causes lower drainage performance of the microscopic drainage channels formed on the rubber surface. The average diameter exceeding 500 μm may cause a lower cut resistance of rubber and a lack of block, and degrade the abrasion resistance on the dry road surface.

The tire according to the present invention is suitable for use in not only passenger vehicles but also various vehicles such as trucks and buses. The tire according to the present invention is suitable for use in a structure that needs to be prevented from skidding on the ice/snow road surface. The tread of the tire can be used for, for example, a replacement tread for a retreaded tire, a solid tire, and the like, where skids on ice need to be prevented. In the case where the tire is a pneumatic tire, not only air but also inert gas such as nitrogen may be used as the gas with which the tire is filled.

The object of the present invention can be achieved by including the ethylene-vinylalcohol copolymer (EVOH) fiber and the inorganic compound powder in the rubber composition forming the foam rubber layer provided in the tread of the tire.

In more detail, the ethylene-vinylalcohol copolymer fiber coated with the resin having affinity for the rubber component and the inorganic compound powder (e.g. aluminum hydroxide) of large particle diameter (greater than or equal to 10 μm in average particle diameter) are used in the rubber composition forming the foam rubber layer provided in the tread of the tire. The inorganic compound powder is desorbed to form bubbles on the tire surface, thus improving the on-ice performance.

Meanwhile, the inorganic compound powder (e.g. aluminum hydroxide) of large particle diameter (greater than or equal to 10 μm in average particle diameter) remains in the foam rubber layer. This suppresses an increase of the bubble component and reduces the rolling resistance.

Moreover, the ethylene-vinylalcohol copolymer fiber is hydrophilic, enabling efficient drainage.

Besides, since the inorganic compound powder (e.g. aluminum hydroxide) of large particle diameter (greater than or equal to 10 μm in average particle diameter) is not incorporated into the nearby ethylene-vinylalcohol copolymer fiber unlike the foam component, the inorganic compound powder exposed and desorbed on the tire surface forms flow channels between the ethylene-vinylalcohol copolymer fibers. The drainage can be further improved in this way.

EXAMPLES

The following describes the present invention in detail based on examples, though the present invention is not limited to these examples.

Manufacturing Example 1: Manufacture of Fiber A on which Coating Layer is Formed Using the above-mentioned two twin screw extruders, 100 parts by mass the ethylene-vinylalcohol copolymer (manufactured by Kuraray Co., Ltd., EVAL F104B) and 10 parts by mass polyethylene (manufactured by Japan Polyethylene Corporation, Novatec U360) were charged into the hopper, the ethylene-vinylalcohol copolymer and the polyethylene were co-extruded from the die outlet 2 and the die outlet 3 respectively, and the fiber obtained according to a common procedure was cut to the length of 5 mm to produce fiber A on which a coating layer made of polyethylene is formed.

The dispersibility, tensile strength (Tb), and breaking elongation (Eb) of the fiber A measured by the following evaluation methods were respectively 7.3, 23.5 MPa, and 578%.

<Dispersibility>

Using a microscope (VHX-500, manufactured by Keyence Corporation), the number of fibers present on the screen at 100-fold magnification was measured, and the measurement was performed in ten different locations in the same rubber. The dispersibility was evaluated from the mean value of the numbers of fibers and the standard deviation of the numbers of fibers present in the respective locations.

<Tensile Strength (Tb)>

The tensile strength (MPa) was determined in compliance with JIS K 6301.

<Breaking Elongation (Eb)>

The breaking elongation (%) was determined in compliance with JIS K 6301.

Manufacturing Example 2: Manufacture of Fiber B

Only polyethylene (manufactured by Japan Polyethylene Corporation, Novatec U360) was charged into the hopper, and the polyethylene was extruded from both the die outlet 2 and the die outlet 3 to produce fiber B in the same way as in manufacturing example 1.

The dispersibility, tensile strength (Tb), and breaking elongation (Eb) of the fiber B measured by the above-mentioned evaluation methods were respectively 7.5, 23.5 MPa, and 521%.

Examples 1 to 8 and Comparative Examples 1 to 11

Nineteen types of rubber compositions in Examples 1 to 8 and Comparative Examples 1 to 11 were formulated as shown in Table 1. Tire treads (foam rubber layers) were formed using the respective rubber compositions, to manufacture nineteen types of passenger vehicle radial tires (195/65R15 in tire size) for each test according to a common procedure. The on-ice performance and rolling resistance (RRC) of each of the passenger vehicle radial tires were evaluated by the following evaluation methods. Table 1 shows the results.

Here, the foaming ratio Vs (%) of the foam rubber layer was calculated by the following equation:

$$Vs=\{(\rho_0/\rho_1)-1\}\times 100(\%)$$

where $\rho_1$ denotes the density (g/cm$^3$) of the foam rubber layer, and $\rho_0$ denotes the density (g/cm$^3$) of the solid phase part in the foam rubber layer. The density of the foam rubber layer and the density of the solid phase part were calculated from the measurement of the mass in ethanol and the mass in air.

<On-Ice Performance>

A passenger vehicle equipped with tires having a tread portion abrasion rate of 20% was driven on a flat ice road, and braked at a speed of 20 km/h to lock the tires. The braking distance to the stopped state was then measured. The results are shown by indices where the inverse of the braking distance of the tire in Comparative Example 1 is 100. A larger index indicates better on-ice braking performance.

Here, the tread portion abrasion rate was calculated by the following equation:

abrasion rate (%)=(1−(groove depth after abrasion)/(groove depth when tread is new))×100.

<Rolling Resistance (RRC)>

The rolling resistance of each tire was measured while rotating the tire by a rotary drum at a speed of 80 km/h. Here, a load of 4.41 kN was used. The results are shown by indices where the measurement in Comparative Example 1 is 100. A larger index indicates a lower rolling resistance.

TABLE 1

| formulation | Example | | | | | | | |
|---|---|---|---|---|---|---|---|---|
| (parts by mass) | 1 | 2 | 3 | 4 | 5 | 6 | 7 | 8 |
| natural rubber | 50 | 50 | 50 | 50 | 50 | 50 | 50 | 50 |
| polybutadiene rubbers[1] | 50 | 50 | 50 | 50 | 50 | 50 | 50 | 50 |
| carbon black[2] | 30 | 30 | 30 | 30 | 30 | 30 | 30 | 30 |
| silica[3] | 30 | 30 | 30 | 30 | 30 | 30 | 30 | 30 |
| aluminum hydroxide[4] | 10 | 20 | 30 | 10 | 20 | 30 | 5 | 5 |
| aluminum hydroxide[12] | — | — | — | — | — | — | — | — |
| silane coupling agent A[5] | 3 | 3 | 3 | 3 | 3 | 3 | 3 | 3 |
| stearic acid | 2 | 2 | 2 | 2 | 2 | 2 | 2 | 2 |
| fiber A[6] | 2.5 | 2.5 | 2.5 | 5 | 5 | 5 | 2.5 | 5 |
| fiber B[7] | — | — | — | — | — | — | — | — |
| age inhibitor (IPPD)[8] | 2.5 | 2.5 | 2.5 | 2.5 | 2.5 | 2.5 | 2.5 | 2.5 |
| zinc oxide | 2 | 2 | 2 | 2 | 2 | 2 | 2 | 2 |
| vulcanization accelerator (MBTS)[9] | 0.6 | 0.6 | 0.6 | 0.6 | 0.6 | 0.6 | 0.6 | 0.6 |
| vulcanization accelerator (CBS)[10] | 1.2 | 1.2 | 1.2 | 1.2 | 1.2 | 1.2 | 1.2 | 1.2 |
| sulfur | 1.3 | 1.3 | 1.3 | 1.3 | 1.3 | 1.3 | 1.3 | 1.3 |
| foaming agent (DPT)[11] | 2.5 | 2 | 1.5 | 2.5 | 2 | 1.5 | 2.5 | 2.5 |
| urea | 2.5 | 2 | 1.5 | 2.5 | 2 | 1.5 | 2.5 | 2.5 |
| foaming ratio (%) | 26 | 21 | 16 | 26 | 21 | 16 | 26 | 26 |
| tire performance | Example | | | | | | | |
| on-ice performance | 106 | 106 | 106 | 109 | 109 | 109 | 103 | 106 |
| RRC | 102 | 107 | 112 | 102 | 107 | 112 | 100 | 100 |

| formulation | Comparative Example | | | | | | | | | | |
|---|---|---|---|---|---|---|---|---|---|---|---|
| (parts by mass) | 1 | 2 | 3 | 4 | 5 | 6 | 7 | 8 | 9 | 10 | 11 |
| natural rubber | 50 | 50 | 50 | 50 | 50 | 50 | 50 | 50 | 50 | 50 | 50 |
| polybutadiene rubbers[1] | 50 | 50 | 50 | 50 | 50 | 50 | 50 | 50 | 50 | 50 | 50 |
| carbon black[2] | 30 | 30 | 30 | 30 | 30 | 30 | 30 | 30 | 30 | 30 | 30 |
| silica[3] | 30 | 30 | 30 | 30 | 30 | 30 | 30 | 30 | 30 | 30 | 30 |
| aluminum hydroxide[4] | — | — | — | 4 | 31 | — | 10 | 10 | 20 | 30 | 20 | 30 |
| aluminum hydroxide[12] | — | — | — | — | — | 10 | — | — | — | — | — |
| silane coupling agent A[5] | 3 | 3 | 3 | 3 | 3 | 3 | 3 | 3 | 3 | 3 | 3 |
| stearic acid | 2 | 2 | 2 | 2 | 2 | 2 | 2 | 2 | 2 | 2 | 2 |
| fiber A[6] | 2.5 | 2.5 | 2.5 | 2.5 | 2.5 | 2.5 | — | — | — | — | — |
| fiber B[7] | — | — | — | — | — | — | 2.5 | 2.5 | 2.5 | 2.5 | 2.5 |
| age inhibitor (IPPD)[8] | 2.5 | 2.5 | 2.5 | 2.5 | 2.5 | 2.5 | 2.5 | 2.5 | 2.5 | 2.5 | 2.5 |
| zinc oxide | 2 | 2 | 2 | 2 | 2 | 2 | 2 | 2 | 2 | 2 | 2 |
| vulcanization accelerator (MBTS)[9] | 0.6 | 0.6 | 0.6 | 0.6 | 0.6 | 0.6 | 0.6 | 0.6 | 0.6 | 0.6 | 0.6 |
| vulcanization accelerator (CBS)[10] | 1.2 | 1.2 | 1.2 | 1.2 | 1.2 | 1.2 | 1.2 | 1.2 | 1.2 | 1.2 | 1.2 |
| sulfur | 1.3 | 1.3 | 1.3 | 1.3 | 1.3 | 1.3 | 1.3 | 1.3 | 1.3 | 1.3 | 1.3 |
| foaming agent (DPT)[11] | 2.5 | 2 | 1.5 | 2.5 | 2.5 | 2.5 | 2.5 | 2 | 1.5 | 2.5 | 2.5 |
| urea | 2.5 | 2 | 1.5 | 2.5 | 2.5 | 2.5 | 2.5 | 2 | 1.5 | 2.5 | 2.5 |
| foaming ratio (%) | 26 | 21 | 16 | 26 | 26 | 26 | 26 | 21 | 16 | 26 | 26 |
| tire performance | Comparative Example | | | | | | | | | | |
| on-ice performance | 100 | 95 | 90 | 100 | 110 | 97 | 97 | 97 | 97 | 101 | 103 |
| RRC | 100 | 103 | 106 | 100 | 97 | 99 | 99 | 98 | 97 | 96 | 94 |

(Notes)
[1] cis-1,4-polybutadiene rubber: (trade name: BR01, manufactured by JSR Corporation)
[2] carbon black: (trade name: Carbon N220, manufactured by Asahi Carbon Co., Ltd.)
[3] silica: (trade name: Nipsil AQ (BET surface area: 220 m$^2$/g, manufactured by Nippon Silica Industrial Co., Ltd.)
[4] aluminum hydroxide: (trade name : Higilite H-31 (average particle diameter: 20 μm), manufactured by Showa Denko K.K.)
[5] bis(3-triethoxysilylpropyl)disulfide
[6] polyethylene-coated ethylene-vinylalcohol copolymer fiber (average fiber length: 5 mm)
[7] polyethylene fiber (average fiber length: 5 mm)
[8] age inhibitor (IPPD): (N-isopropyl-N'-phenyl-p-phenylenediamine)
[9] vulcanization accelerator (MBTS): dibenzothiazyldisulfide
[10] vulcanization accelerator (CBS): N-cyclohexyl-2-benzothiazilsulfenamide
[11] foaming agent (DPT): dinitrosopentamethylenetetramine
[12] aluminum hydroxide: (trade name: Higilite H-32 (average particle diameter: 8 μm), manufactured by Showa Denko K.K.)

INDUSTRIAL APPLICABILITY

The tire according to the present invention can deliver improved on-ice performance with a reduced rolling resistance, and has very high industrial applicability. The tire according to the present invention is suitable for use as a passenger vehicle tire, a light passenger vehicle tire, a light truck tire, and a truck/bus tire, and is particularly suitable as a passenger vehicle radial tire for winter or for all seasons.

REFERENCE SIGNS LIST

1 die of twin screw extruder
2 die outlet for ethylene-vinylalcohol copolymer 3 die outlet for resin having affinity for rubber component
10 tire
11, 11' pair of bead portions
12 carcass
13 belt
14 tread
15 cap portion
16 base portion
100 ethylene-vinylalcohol copolymer fiber on which coating layer made of resin having affinity for rubber component is formed
A ethylene-vinylalcohol copolymer
B resin having affinity for rubber component

The invention claimed is:

1. A tire comprising a foam rubber layer in a tread that comes into contact with a road surface,
wherein a foaming ratio of the foam rubber layer is in a range from 3% to 50%,
a rubber composition forming the foam rubber layer includes ethylene-vinylalcohol copolymer fiber coated with a resin having affinity for a rubber component, the resin having affinity for the rubber component being a polyolefin-based resin; and
the rubber composition forming the foam rubber layer includes 5 to 30 parts by mass at least one type of inorganic compound powder with respect to 100 parts by mass the rubber component, the inorganic compound powder having an average particle diameter greater than or equal to 10 μm and expressed by the following general formula (I):

$$M \cdot xSiO_2 \cdot yH_2O \quad (I)$$

where M is a metal oxide or a metal hydroxide of a metal selected from the group consisting of Al, Mg, Ti, and Ca, and x and y are each independently an integer from 0 to 10.

2. The tire according to claim 1,
wherein the inorganic compound powder expressed by the general formula (I) is an inorganic compound powder expressed by the following general formula (II):

$$Al_2O_3 \cdot mSiO_2 \cdot nH_2O \quad (II)$$

where m and n are each independently an integer from 0 to 4.

3. The tire according to claim 1,
wherein the inorganic compound powder expressed by the general formula (I) is a powder made of aluminum hydroxide.

4. The tire according to claim 1,
wherein a loading amount of the ethylene-vinylalcohol copolymer fiber coated with the resin having affinity for the rubber component is 0.1 to 100 parts by mass with respect to 100 parts by mass the rubber component.

5. The tire according to claim 1,
wherein the polyolefin-based resin is at least one type selected from the group consisting of a polyethylene-based resin, a polypropylene-based resin, a polyolefin ionomer resin, and a maleic anhydride modified α-polyolefin resin.

6. The tire according to claim 1,
wherein the rubber composition includes 5 to 55 parts by mass carbon black and 5 to 55 parts by mass silica with respect to 100 parts by mass the rubber component.

* * * * *